United States Patent
Acosta et al.

(10) Patent No.: US 11,649,394 B2
(45) Date of Patent: May 16, 2023

(54) IONIC LIQUID-BASED PRODUCTS FOR IOR APPLICATIONS

(71) Applicant: Alchemy Sciences, Inc., Houston, TX (US)

(72) Inventors: Erick Acosta, Sugar Land, TX (US); Luchao Jin, Houston, TX (US)

(73) Assignee: ALCHEMY SCIENCES, INC., Houston, TX (US)

( * ) Notice: Subject to any disclaimer, the term of this patent is extended or adjusted under 35 U.S.C. 154(b) by 0 days.

(21) Appl. No.: 17/527,635

(22) Filed: Nov. 16, 2021

(65) Prior Publication Data

US 2022/0154066 A1 May 19, 2022

Related U.S. Application Data

(60) Provisional application No. 63/115,882, filed on Nov. 19, 2020.

(51) Int. Cl.
*C09K 8/58* (2006.01)

(52) U.S. Cl.
CPC ...................... *C09K 8/58* (2013.01)

(58) Field of Classification Search
CPC .............. C09K 8/58; C09K 8/68; C09K 8/74
See application file for complete search history.

(56) References Cited

U.S. PATENT DOCUMENTS

| | | | |
|---|---|---|---|
| 6,350,721 B1 * | 2/2002 | Fu | C09K 8/72 507/237 |
| 7,468,343 B2 | 12/2008 | Campbell et al. | |
| 8,920,638 B2 | 12/2014 | Petcavich | |
| 9,279,086 B2 * | 3/2016 | Hardacre | C10G 25/003 |
| 2006/0240727 A1 | 10/2006 | Price et al. | |
| 2009/0029880 A1 * | 1/2009 | Berry | C09K 8/86 507/243 |
| 2015/0252249 A1 | 9/2015 | Hill et al. | |

OTHER PUBLICATIONS

Velusamy et al., "Substantial Enhancement of Heavy Crude Oil Dissolution in Low Waxy Crude Oil in the Presence of Ionic Liquid"; Ind. Eng. Chem. Res. 2015, 54, pp. 7999-8009.
Eastoe et al., "Ionic Liquid-in-Oil Microemulsions"; J. Am. Chem. Soc. 9 vol. 127, No. 20, 2005, 5 pages.
Seth et al., "Interaction of Ionic Liquid with Water in Ternary Microemulsions (Triton X-100/Water/1-Butyl-3-methylimidazolium Hexafluorophosphate) Probed by Solvent and Rotational Relaxation of Coumarin 153 and Coumarin 151"; Langmuir, 2006, vol. 22, No. 18, pp. 7768-7775.
Koel et al., "Using neoteric solvents in oil shale studies"; Pure Appl. Chem., vol. 73, No. 1, pp. 153-159, 2001.
Bin-Dahbag et al., "Experimental Study of Use of Ionic Liquids in Enhanced Oil Recovery"; J Pet Environ Biotechnol 2014, vol. 4, Issue 6, 7 pages.
Mehta et al., "Ionic liquid microemulsions and their technological applications"; Indian Journal of Chemistry; vol. 49A, May-Jun. 2010, pp. 662-684.
Joonaki et al, "A New Approach to Simultaneously Enhancing Heavy Oil Recovery and Hindering Asphaltene Precipitation"; Iranian Journal of Oil & Gas Science and Technology, vol. 1 (2012), No. 1, pp. 37-42.
Pereira et al., "Ionic liquid enhanced oil recovery in sand-pack columns"; Fuel 134 (2014) pp. 196-200.

* cited by examiner

*Primary Examiner* — Alicia Bland
(74) *Attorney, Agent, or Firm* — Ewing & Jones, PLLC

(57) ABSTRACT

A method includes forming an ionic liquid-based product, the ionic liquid-based product including an ionic liquid and mixing the ionic-liquid based product with a fluid. The method also includes injecting the fluid mixed with the ionic-liquid based product into a formation as part of an Improved Oil Recovery (IOR) application.

6 Claims, No Drawings

IONIC LIQUID-BASED PRODUCTS FOR IOR APPLICATIONS

This application is a non-provisional application which claims priority from U.S. provisional application No. 63/115,882, filed Nov. 19, 2020, which is incorporated by reference herein in its entirety.

BACKGROUND

Field

This disclosure relates generally to the field of treatment fluids used in improved oil recovery ("IOR") applications during hydrocarbon recovery.

Background Art

Improved Oil Recovery methods target hydrocarbon resources not capable of being produced by primary production methods using the reservoir's internal energy or drive mechanism. Examples of IOR include well-stimulation, secondary recovery, and tertiary recovery. Well-stimulation is most often typified by hydraulic fracturing and matrix acidizing operations. In hydraulic fracturing, a fluid is injected at high pressure into a wellbore to create cracks in the formation. The fluid may include acids, thickening agents, corrosion inhibitors, biocides, scale inhibitors, surfactants and other chemicals. In acidizing, an acid is injection into a porous reservoir to dissolve residual drilling fluids and natural sediments in the well perforations and near-wellbore areas. In secondary recovery, water is injected into the reservoir to provide an external force to push hydrocarbons to the wellbore for extraction. In tertiary recovery methods fluids are injected into the reservoir as part of Enhanced Oil Recovery (EOR), which aids in crude oil production by supplying external reservoir energy plus modifying rock and fluid properties. Examples include thermal recovery, such as by steam injection, chemical injection, and gas injection to increase the oil mobility.

SUMMARY

The disclosure includes a method including forming an ionic liquid-based product, the ionic liquid-based product including an ionic liquid and mixing the ionic-liquid based product with a fluid. The method also includes injecting the fluid mixed with the ionic-liquid based product into a formation as part of an Improved Oil Recovery (IOR) application.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure is not limited to the embodiments, versions, or examples described, which are included to enable a person having ordinary skill in the art to make and use the disclosed subject matter when the information contained herein is combined with existing information and technology.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. For example, if the detailed description recites a range of from 1 to 5, that range includes all iterative ranges within that range including, for instance, 1.3-2.7 or 4.9-4.95.

The present disclosure describes a method of use of ionic liquid-based products for IOR applications. The ionic liquid-based products include an ionic liquid, which is a salt having a melting point below 100° C. Non-limiting examples of ionic liquids include:

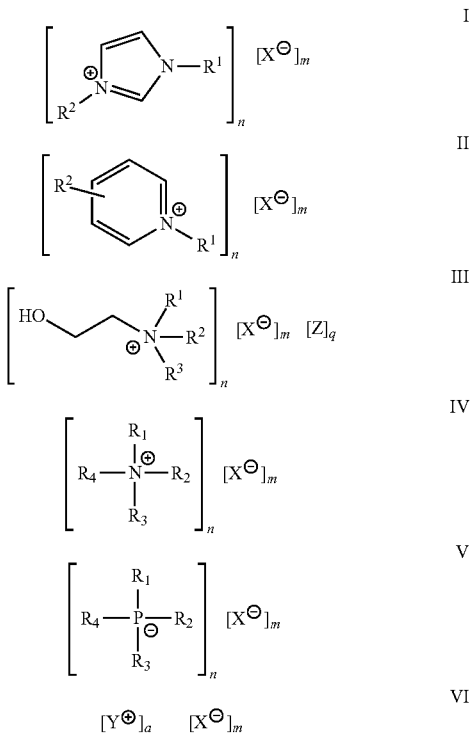

Where $R^1$-$R^4$ are selected from linear or branched, substituted or unsubstituted, alkyls, aryls, alkoxyalkyls, alkylenearyl hydroxyalkyls, or haloalkyls; X is an anion; Y is a cation; Z is a neutral molecule capable of hydrogen bonding; m and n are chosen to provide electronic neutrality; and q is an integer from 0 to 1000. In these embodiments, the resulting salt is a liquid at about 40° C. or less. Non-limiting examples of X include methylsulfate, PF, BF, or halide. Non-limiting examples of Z include glycerol, citric acid, urea, or other such neutral proton donors or acceptors, and Y typically contain a heteroatom, such as nitrogen or phosphate. As will be appreciated by one of ordinary skill in the art with the benefit of this disclosure, the R, X, and Z moieties may be varied so as to provide the desired Solvating properties, viscosity, melting point, and other properties, for the intended application.

Certain ionic liquids are water-soluble; others are not. When the ionic liquid-based product includes water-soluble ionic liquid, the ionic liquid may be combined with water to form a solution. When the ionic liquid is not water soluble, a microemulsion or emulsion may be formulated to form the ionic-liquid based product. The microemulsion or emulsion may include water, the ionic liquid, solvent, and a surfactant. Surfactants may include nonionic, anionic, cationic, and zwitterionic surfactants. The water used in the ionic liquid-based product may be fresh water, brine, or produced water, for example and without limitation.

In certain embodiments, the ionic liquid may be dissolved in a solvent and included in the ionic liquid based product. Non-limiting examples of solvents include alkanes, cycloalkanes, aromatic, alcohols, esters and ethers, ketones, amines, phenols, chloroform, terpenes, d-limonene, ethylene glycol, and polyethylene glycol. In certain embodiments, the ionic liquid may first be dissolved in the solvent and then mixed with water and the surfactant to form the emulsion or microemulsion.

Without being bound by theory, it is believed that the ionic liquid may reduce interfacial tension and alter wettability. Further the ionic liquid may enhance solubility of heavy components in light ends in the hydrocarbon reservoir. Also, ionic liquids may improve sweep efficiency of waterflooding reservoirs and reduce formation damage caused by clay swelling and fines migration.

In hydraulic fracturing, remediation, and repressurization of parent wells and any intervention in an existing producing well, the ionic liquid-based product may be mixed with the treatment fluid prior to injection into the formation. In acidizing, the ionic liquid-based product may be combined with the acid prior to injection. In secondary and tertiary recovery, the ionic liquid-based product may be mixed with the injected water prior to injection into the reservoir. As used herein, the fracturing fluid, acid, and injected water are referred to as "fluids."

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A method comprising:
forming an ionic liquid-based product, the ionic liquid-based product including an ionic liquid;
mixing the ionic-liquid based product with a fluid, the ionic liquid being

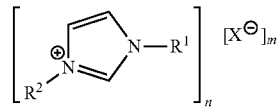

wherein at least one of R1 and R2 is selected from substituted or unsubstituted aryls and alkylenearyl hydroxalkyls; X is an anion; and m and n are chosen to provide electronic neutrality; and
injecting the fluid mixed with the ionic-liquid based product into a formation as part of an Improved Oil Recovery (IOR) application.

2. The method of claim 1, wherein X is methylsulfate, PF, BF, or a halide.

3. The method of claim 1, wherein the IOR is a hydraulic fracturing operation and the fluid is a fracturing fluid.

4. The method of claim 1, wherein the IOR is an acidizing operation and the fluid is an acid.

5. The method of claim 1, wherein the IOR is a secondary recovery and the fluid is injected water.

6. The method of claim 1, wherein the IOR is a tertiary recovery and the fluid is injected water.

* * * * *